(12) United States Patent
Burch

(10) Patent No.: US 7,111,722 B2
(45) Date of Patent: Sep. 26, 2006

(54) ANGLED-ROLLER BELT CONVEYOR

(75) Inventor: Ronald H. Burch, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 242 days.

(21) Appl. No.: 10/710,949

(22) Filed: Aug. 13, 2004

(65) Prior Publication Data

US 2006/0032727 A1 Feb. 16, 2006

(51) Int. Cl.
B65G 47/24 (2006.01)
(52) U.S. Cl. .................. 198/411; 198/416; 198/779
(58) Field of Classification Search .......... 198/411, 198/416, 779, 399, 394, 502.2, 502.3
See application file for complete search history.

(56) References Cited

U.S. PATENT DOCUMENTS

| | | | |
|---|---|---|---|
| 3,047,123 A * | 7/1962 | McKay .................. 198/415 |
| 3,550,756 A | 12/1970 | Kornylak | |
| 3,679,043 A * | 7/1972 | Becker .................. 198/349 |
| 3,973,672 A | 8/1976 | Frost | |
| 4,039,074 A | 8/1977 | Maxted | |
| 4,085,839 A | 4/1978 | Crawford .................. 198/410 |
| 4,143,756 A | 3/1979 | Chorlton | |
| 4,607,743 A | 8/1986 | Elam .................. 198/415 |
| 4,889,224 A * | 12/1989 | Denker .................. 198/382 |
| 4,901,842 A | 2/1990 | Lemboke et al. ........... 198/415 |
| 4,930,615 A | 6/1990 | Nash .................. 198/411 |
| 5,074,400 A | 12/1991 | Focke et al. .................. 198/415 |
| 5,092,447 A | 3/1992 | Wyman | |
| 5,101,958 A | 4/1992 | LeMay et al. | |
| 5,191,962 A | 3/1993 | Wegscheider et al. ...... 198/415 |
| 5,551,543 A * | 9/1996 | Mattingly et al. ..... 198/370.09 |
| 5,660,262 A | 8/1997 | Landrum et al. ........... 198/411 |
| 5,836,439 A | 11/1998 | Coyette .................. 198/415 |
| 5,924,548 A | 7/1999 | Francioni .................. 198/415 |
| 6,494,312 B1 | 12/2002 | Costanzo .................. 198/779 |
| 6,508,351 B1 | 1/2003 | Christoffersen et al. .... 198/394 |
| 6,568,522 B1 | 5/2003 | Boelaars | |
| 6,758,323 B1 | 7/2004 | Costanzo .................. 198/457.02 |
| 6,863,173 B1 * | 3/2005 | Bennett .................. 198/416 |
| 6,923,309 B1 | 8/2005 | Costanzo | |
| 7,007,792 B1 * | 3/2006 | Burch .................. 198/457.02 |

FOREIGN PATENT DOCUMENTS

| | | |
|---|---|---|
| EP | 0682963 A1 | 2/2004 |
| JP | 6-278842 A | 10/1994 |
| JP | 08-277029 A | 10/1996 |

OTHER PUBLICATIONS

European Patent Office, Search Report of European Patent Application No. 05254753.6, Oct. 5, 2005.

* cited by examiner

Primary Examiner—Douglas A. Hess
(74) Attorney, Agent, or Firm—James T. Cronvich

(57) ABSTRACT

A conveyor and a method for rotating and registering an article against a rail. The conveyor includes an angled-roller conveyor belt whose article-supporting rollers are arranged to rotate about axes directing conveyed articles toward a side rail. An obstruction is selectively activated to move into a position just above a top article-conveying surface of the belt. In that position, the obstruction intercepts conveyed articles. The obstruction forms a pivot about which the articles rotate as the belt advances and the angled rollers rotate. An electric eye or other sensor sensitive to oversized or misoriented articles controls the positioning of the obstruction to rotate misoriented articles 90° or to let correctly oriented articles pass without contact and reorientation.

49 Claims, 5 Drawing Sheets

ANGLED-ROLLER BELT CONVEYOR

BACKGROUND OF INVENTION

The invention relates generally to power-driven conveyors and, more particularly, to a conveyor using a conveyor belt with rollers arranged to rotate about axes oblique to the direction of belt travel.

Many conveying applications require that conveyed articles of a variety of sizes and shapes be aligned single file in a specific orientation for downstream processing or inspection. Sometimes the width of the conveyor or of the entrance into a processing station is limited. In the case of articles having a generally rectangular footprint, with a minor axis and a longer major axis, the major axis or the diagonal can be longer than the width of the conveyor. If the major axis of an oversized conveyed article is arranged on the conveyor belt with its long axis across the width of the belt, the article can jam between the sides of the conveyor. Manual intervention is then required to free the jam. Consequently, there is a need for a conveyor that can align and orient articles of a variety of sizes and shapes to prevent jamming on width-restricted conveyor sections.

SUMMARY OF INVENTION

This need and other needs are satisfied by a conveyor embodying features of the invention. In one aspect, a conveyor includes a conveyor belt running along a conveying path in a direction of belt travel. The belt has an article-conveying surface that extends transverse to the direction of belt travel from a first side to a second side. Article-supporting rollers at the article-conveying surface are arranged to direct supported articles toward the first side of the belt as it runs in the direction of belt travel. A movable obstruction defines a pivot point disposed above the article-conveying surface of the belt between its first and second sides. The obstruction intercepts a conveyed article, which pivots about the pivot point to change its orientation as the belt runs.

In another aspect of the invention, a conveyor includes a conveyor belt supported on a conveyor carryway running in a direction of belt travel. The belt includes an article-conveying surface that extends transverse to the direction of belt travel from a first side to a second side. Article-supporting rollers extending above the article-conveying surface of the belt are in rolling contact with the carryway. The rollers are arranged to rotate about axes oblique to the direction of belt travel. In this way, the rollers direct supported articles toward the first side of the conveyor belt. A rail at the first side of the belt receives articles directed across the belt. A movable obstruction disposed over the carryway above the article-conveying surface of the belt includes a pivot point. The obstruction intercepts a conveyed article and causes it to pivot about the pivot point as the belt runs in the direction of belt travel.

In yet another aspect of the invention, a conveyor comprises an angled-roller belt that extends in width from a first side to a second side and in thickness from a top surface to a bottom surface. The belt travels in a direction of belt travel. Article-supporting rollers in the belt are arranged to rotate about axes oblique to the direction of belt travel. Salient portions of the rollers extend beyond the top and bottom surfaces of the belt. A roller bearing surface disposed beneath the angled-roller belt contacts the rollers in rolling contact to rotate the rollers about the axes. The rotation of the angled rollers directs conveyed articles toward the first side of the belt. A movable obstruction disposed above the top surface of the angled-roller belt defines a pivot point about which conveyed articles intercepted by the obstruction pivot as the belt travels.

In still another aspect of the invention, a conveyor includes a roller-top conveyor belt traveling in a direction of belt travel. Article-supporting rollers on the belt are arranged to rotate about axes oblique to the direction of belt travel. A movable obstruction is disposed over the roller-top belt in a position to contact conveyed articles and act as a pivot about which conveyed articles pivot as the roller-top belt is traveling.

Another aspect of the invention is a method for rotating a conveyed article and registering it against a rail. According to the method, a rail is provided along the side of a moving roller-top conveyor belt. An article is conveyed along the moving roller-top belt, which has rollers arranged to rotate to direct the article toward the rail. An obstruction is moved to a position above the roller-top belt to intercept articles conveyed along the belt and to cause the articles to rotate at the obstruction as the belt moves.

BRIEF DESCRIPTION OF DRAWINGS

These and other features and aspects of the invention, as well as its advantages, are better understood by reference to the following description, appended claims, and accompanying drawings, in which:

DETAILED DESCRIPTION

Figure 1:
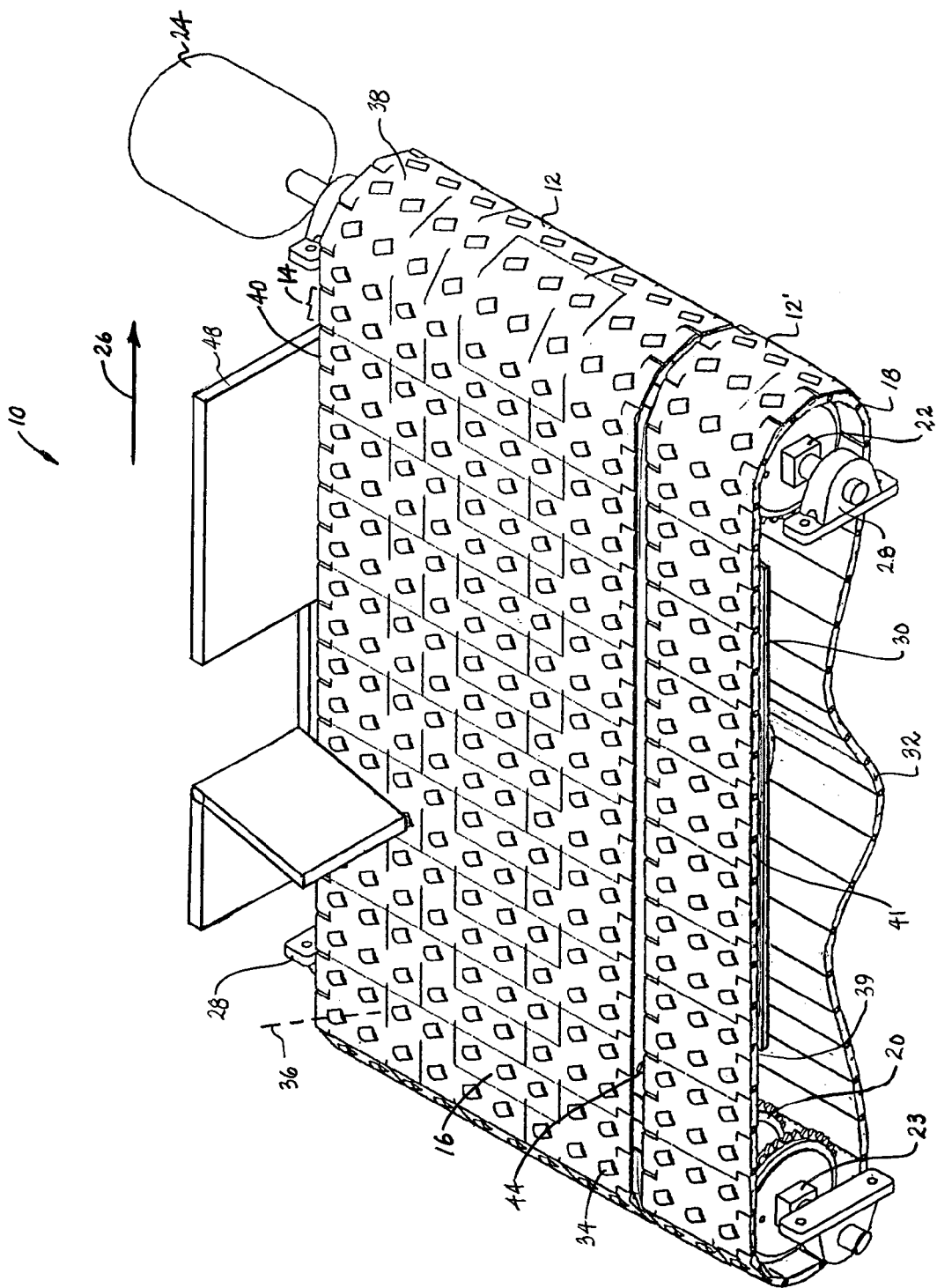
FIG. 1 is a pictorial view of a roller-top conveyor embodying features of the invention, including an article-pivoting obstruction.

One version of a conveyor embodying features of the invention is shown in FIG. 1. The conveyor 10 includes a belt 12, in this case, an angled-roller belt, such as the Series 400 Angled Roller Belt manufactured and sold by Intralox, L.L.C., of Harahan, La., U.S.A. Such a belt is also described in U.S. Pat. No. 6,494,312, which is incorporated by reference. The belt is a modular plastic belt consisting of a series of rows 14 of belt modules 16 having leading and trailing hinge eyes interleaved with the trailing and leading hinge eyes of adjacent rows and inter-connected by hinge pins 18 installed in lateral passageways formed by the aligned interleaved hinge eyes between adjacent rows. Each row is formed of one or more modules. If more than one module forms each row, the modules are preferably arranged in a bricklay pattern for strength. Consecutive rows pivot about the hinge joints between rows as the belt articulates about sprockets 20, which are mounted on a drive shaft 22 and an idler shaft 23. A motor 24 coupled to the drive shaft rotates the shaft and the sprockets to drive the belt in a direction of travel 26. Bearing blocks 28 support the drive and idler shafts at opposite ends. The conveyor is conventionally supported in a frame, which is omitted from the drawings for clarity. The conveyor also includes a carryway 30, which may be realized as a pan or a set of parallel, longitudinal wearstrips underlying the belt along the conveying portion of the belt path. The belt makes its return trip along a lower returnway 32, which typically would include support rollers or shoes.

The belt includes rollers 34 arranged to rotate about axes 36 oblique to the longitudinal direction of belt travel 26. Salient portions of the rollers extend above an outer, top surface 38 and below an inner, bottom surface 39 of the belt along the carryway. The salient portions of the rollers extending below the bottom surface of the belt ride along the carryway in rolling contact. The rotation of the rollers as the belt is driven in the direction of belt travel directs articles supported on the rollers to a first side 40 of the belt. As one example, the rollers are realized as generally cylindrical rollers with a central bore that receives an axle defining the axis about which the roller rotates as the belt is driven.

Figure 2:
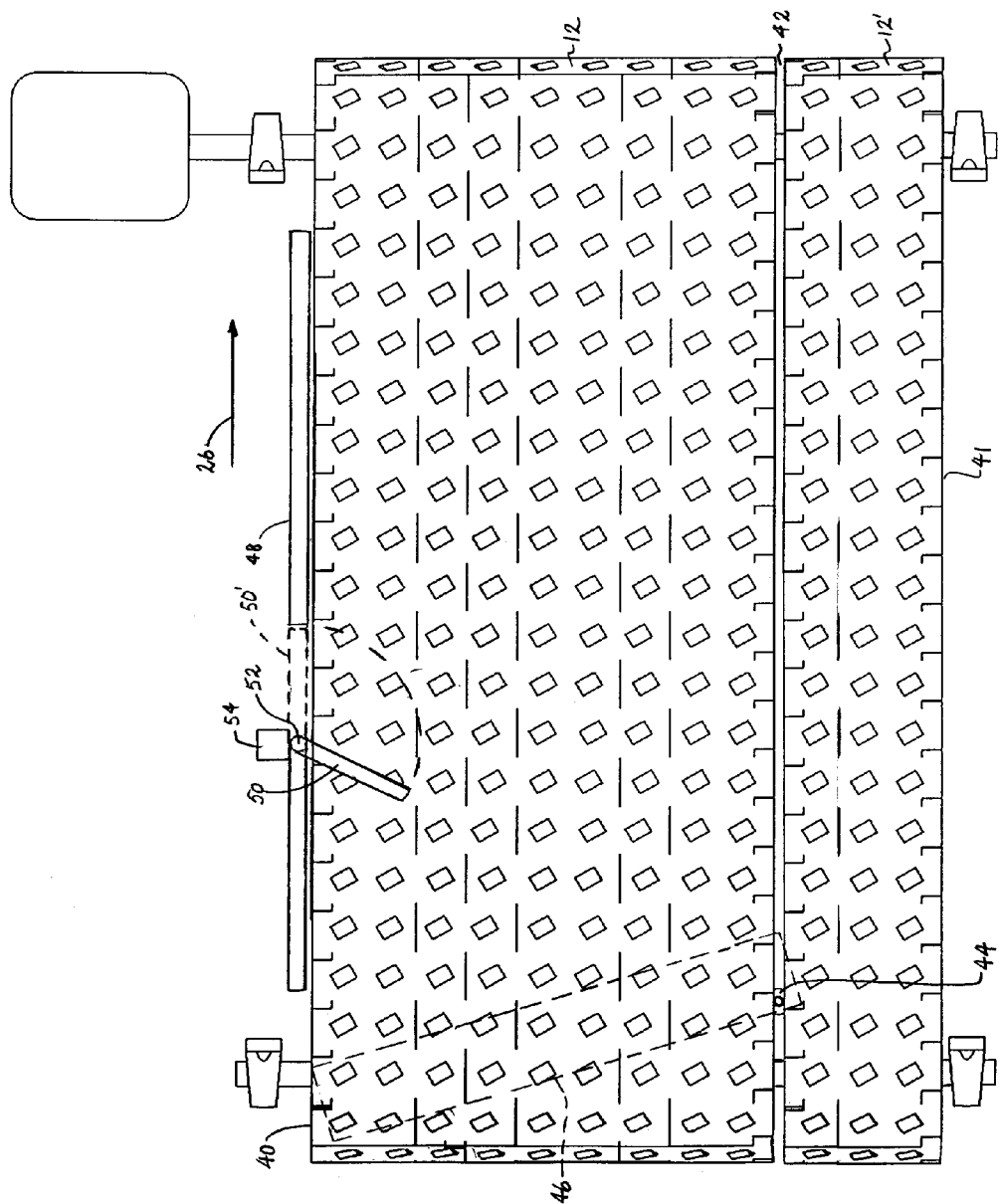
FIG. 2 is a top plan view of the conveyor of FIG. 1 showing the obstruction in obstructing and unobstructing (in phantom) positions.

As shown in FIG. 1, the belt extends transversely from the first side 40 to a second side 41. In this example, the belt is formed from two belts 12, 12' arranged in parallel across a narrow gap 42 around the same shafts. The gap defines the interior boundary of a forbidden zone into which a conveyed article may not extend at some down-stream location. The gap allows a photo eye 44 to be positioned between the two belts beneath the carryway. An article, such as article 46 in FIG. 2, in a position over the photo eye shades it from the ambient light it normally receives in the absence of an occluding article. The photo eye senses the decrease in impinging light and produces a signal indicating that condition. Although the detector used in this example to detect the presence of an article at a specific position on the belt is a photo eye, other kinds of detectors could be used in the same or in different positions. Other sensors that can be used at the boundary of the forbidden zone to detect an article's presence include proximity photoelectric eyes sensitive to changes in reflectivity, limit switches with an actuating arm extending to the boundary of the forbidden zone, weight sensors, ultrasonic sensors, and capacitive sensors. If the sensor does not have to be positioned below the belt carryway as in FIGS. 1 and 2, a single belt, without a gap, can be used. In that case, the sensor is positioned to be actuated by any article extending over the boundary into the forbidden zone.

A side rail 48 along the first side 40 of the belt serves as a registration surface for articles conveyed on the belt. A gate 50 attaches to the rail at a hinge 52. When the gate swings out to a position over the article-conveying top surface of the belt between the first and second sides, it acts as an obstruction intercepting articles conveyed atop the belt. When the gate 50' is closed, it retracts into the rail or forms part of the rail. A gate control mechanism 54 including an electric, pneumatic, or hydraulic motor or other control device receives the signal from the photo eye or other misoriented or oversized article sensor directly or from an intervening controller to open or close the gate.

Figure 3A:
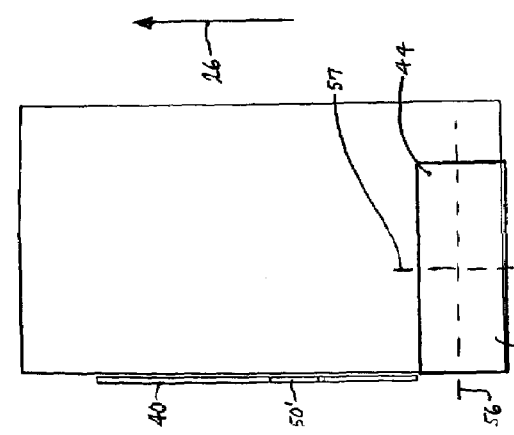
FIGS. 3A–3E are top schematic representations of the operation of the conveyor of FIG. 1.
Figure 3B:
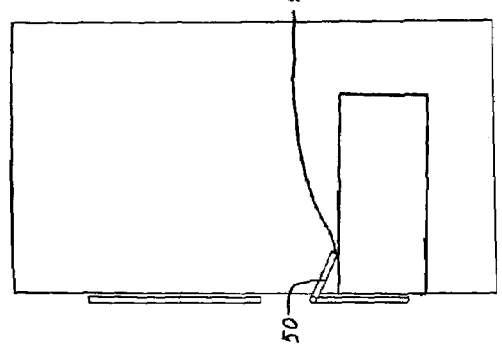
Figure 3C:
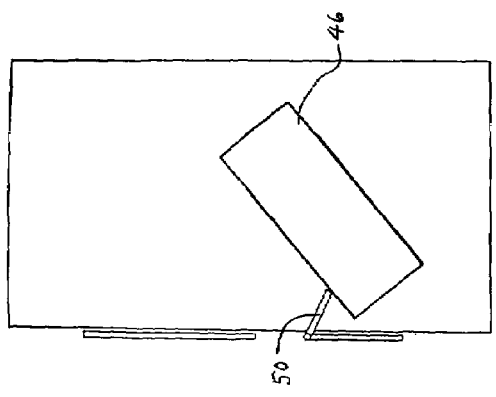
Figure 3D:
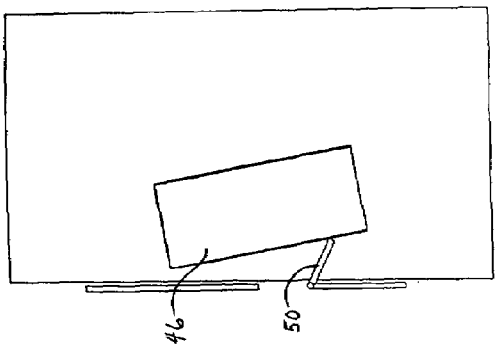
Figure 3E:
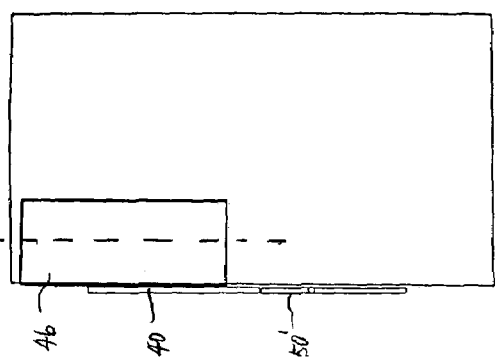

The operation and purpose of the gate are depicted in FIGS. 3A–3E. An article 46 shown with a generally rectangular footprint has a long major axis 56 and a shorter minor axis 57. The article is shown in FIG. 3A registered along the side rail 40 with its minor axis in the direction of belt travel 26. The desired orientation of the article is with its major axis in the direction of belt travel, in other words, rotated 90° from its orientation in FIG. 3A. With its long axis as shown, the article extends into the forbidden zone and occludes the photo eye 44, which sends a signal indicating an improperly oriented article. The signal causes the normally closed gate 50' to open to the position shown in FIGS. 3B–3D. The open gate 50 forms an obstruction that intercepts the advancing article. The end 58 of the gate contacts the article and forms a pivot point about which the article pivots (FIGS. 3C and 3D) as the belt advances and the article-supporting rollers continue to rotate. (In this example, the gate actually forms a pivot line, rather than a single point. As used throughout this specification, the term "pivot point" means any set of one or more points about which a conveyed article pivots.) After a period of time that may be empirically determined or selectively preset, the gate closes as in FIG. 3E. The rollers then direct the article, rotated 90° into the proper orientation against the side rail. In this way, the obstruction can be used to reorient misoriented articles so that they can fit between the side rails of limited width portions of a conveying path or into restricted-width processing equipment downstream. A small article or a properly oriented article does not occlude the photo eye or other sensor, and the gate remains closed. The properly oriented article is not pivoted 90°.

Figure 4:
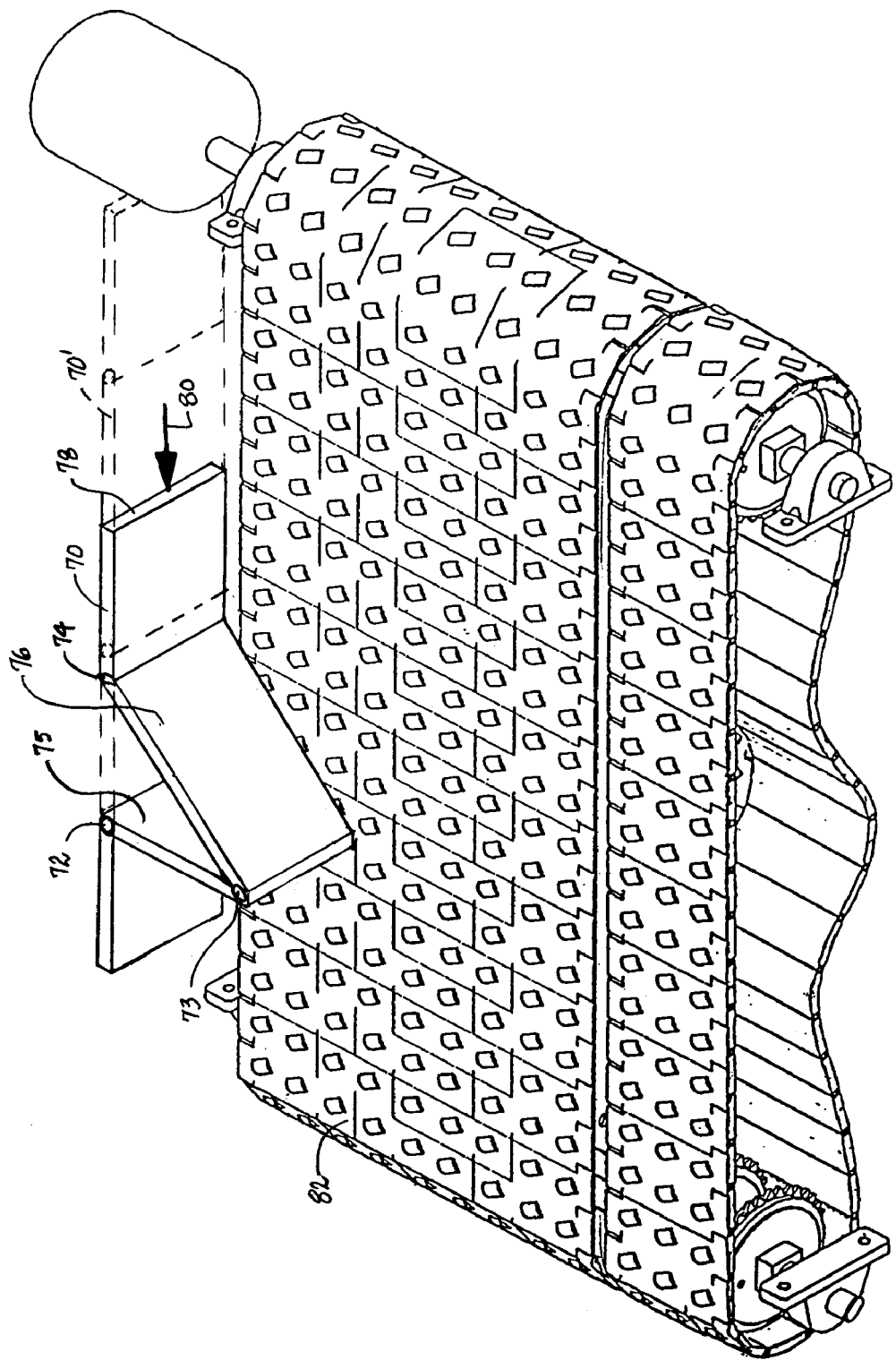
FIG. 4 is a pictorial view of another version of roller-top conveyor embodying features of the invention, including a folding side rail.

Another version of a conveyor for selectively reorienting conveyed articles is shown in FIG. 4. In this version, a folding side rail 70 forms the obstruction. The side rail includes three hinges: a stationary hinge 72 and two movable hinges 73 and 74. First and second folding panels 75 and 76 are between the hinges. The side rail is normally in a linear, unobstructing position 70' as indicated by the phantom lines in FIG. 4. When an article needs to be reoriented, the downstream end 78 of the rail is pushed, by a pneumatic cylinder, for example, in an upstream direction as indicated by arrow 80. The push against the stationary hinge 72 forces the two panels out over the surface of a belt 82 into the position shown. The hinge 73 between the two panels forms an obstructing edge that pivots articles that contact it as the belt advances. Once the article has been reoriented, the rail is pushed in the opposite direction back to the unfolded, unobstructing state.

Figure 5:
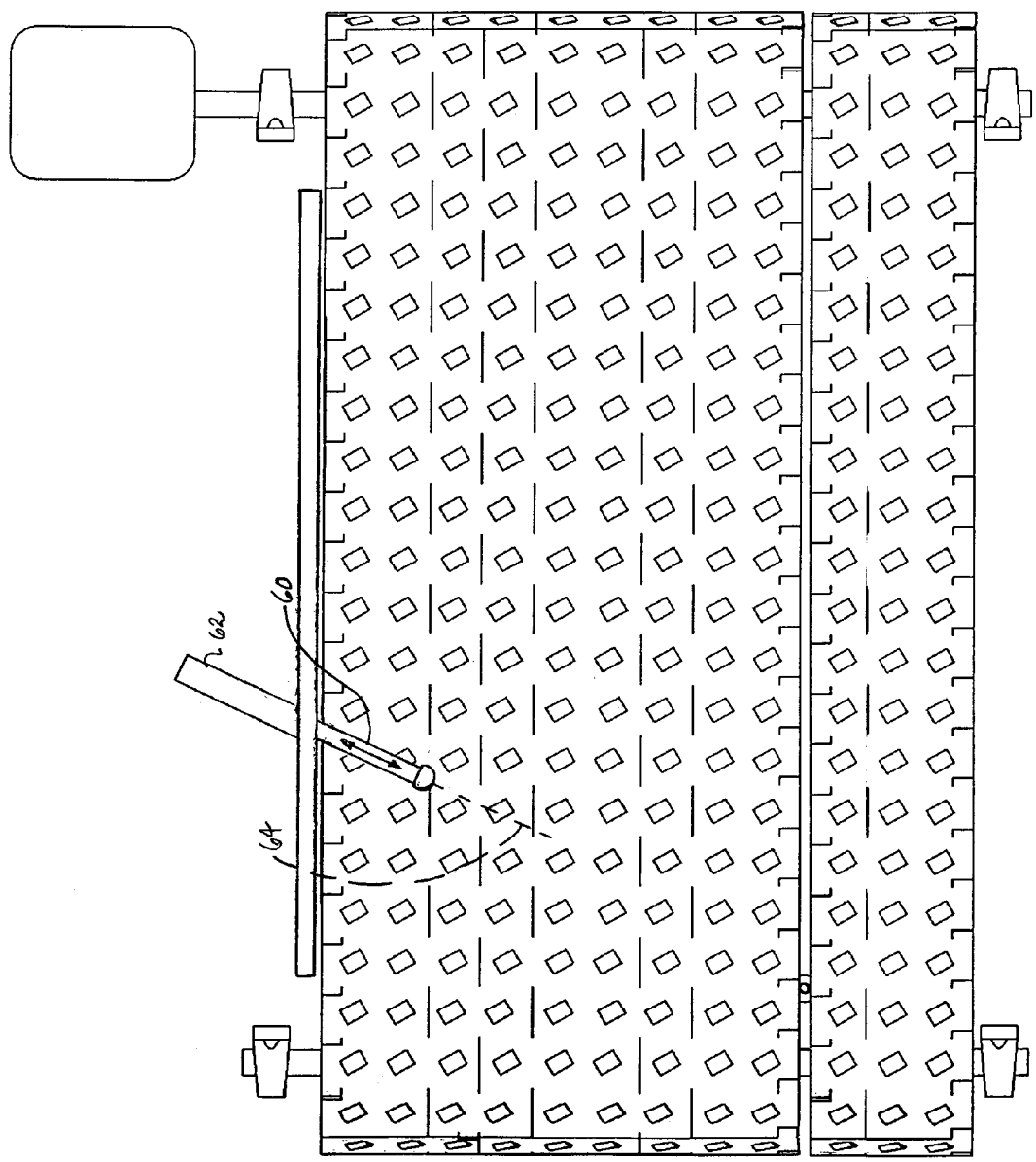
FIG. 5 is a top plan view of another version of a conveyor as in FIG. 1 with a different version of obstruction, including a pusher bar.

Another version of an obstruction for reorienting a conveyed article is shown in FIG. 5. In this example, the obstruction is in the form of a push bar 60 driven, for instance, by a pneumatic cylinder 62. The end 64 of the push bar serves as a pivot point about which a conveyed article can pivot when intercepted by the bar. Instead of forming a pivot point at a specific position as in FIG. 1, the push bar can be steadily extended along a line of action 64 over the article-conveying surface of the belt. By pushing against an article to be rotated, the push bar can aid the rotation and reorientation. Thus, the push bar defines a dynamic pivot point along the conveyor.

Although the invention has been described with reference to a couple of versions, other versions are possible. In addition to the variety of sensors that could be used, the obstruction could be realized in many ways. As one example, the obstruction can be a post that extends and retracts through a gap between side-by-side parallel belts. As another example, the obstruction can extend down-ward from and retract upward into an overhead location. As yet another example, the push bar can be a push sheet that presents a vertical pivot line to misoriented articles. So, as these few examples suggest the scope of the claims is not meant to be limited to the version described in detail.

What is claimed is:

1. A conveyor comprising:
   a conveyor belt running along a conveying path in a direction of belt travel and including an article-conveying surface extending transverse to the direction of belt travel from a first side to a second side;

wherein the conveyor belt includes a plurality of article-supporting rollers at the article-conveying surface arranged to direct supported articles toward the first side of the conveyor belt as the conveyor belt runs in the direction of belt travel;

a movable obstruction defining a pivot point disposed above the article-conveying surface of the conveyor belt between the first and second sides of the conveyor;

wherein the movable obstruction intercepts a conveyed article and the article pivots at the pivot point as the conveyor belt runs in the direction of belt travel.

2. A conveyor as in claim 1 wherein the movable obstruction is movable between a first position over the article-conveying surface obstructing conveyed articles and a second position not obstructing conveyed articles.

3. A conveyor as in claim 2 wherein the movable obstruction remains in the first position for a preselected period of time.

4. A conveyor as in claim 1 wherein the movable obstruction swings out over the article-conveying surface of the belt from a position at the first side of the belt.

5. A conveyor as in claim 1 wherein the movable obstruction comprises a pusher bar extensible from the first side of the belt out over the article-conveying surface.

6. A conveyor as in claim 1 wherein the movable obstruction comprises a foldable side rail.

7. A conveyor as in claim 1 wherein the position of the pivot point over the article-conveying surface is changeable during its contact with a conveyed article.

8. A conveyor as in claim 1 further comprising a sensor detecting the presence of a conveyed article at a specific position on the conveyor.

9. A conveyor as in claim 8 wherein the sensor is selected from the group consisting of photo eyes, limit switches, weight sensors, ultrasonic sensors, and capacitive sensors.

10. A conveyor as in claim 8 wherein the conveyor belt comprises a pair of parallel conveyor belts separated by a gap and wherein the sensor is positioned beneath the conveyor belt along the conveying path and vertically aligned with the gap.

11. A conveyor as in claim 8 wherein the sensor produces a signal indicative of a misoriented or oversized article on the article-conveying surface of the belt.

12. A conveyor comprising:
a conveyor carryway;
a conveyor belt supported on the carryway and running in a direction of belt travel and including an article-conveying surface extending transverse to the direction of belt travel from a first side to a second side;
wherein the conveyor belt includes a plurality of article-supporting rollers in rolling contact with the carryway that extend above the article-conveying surface and that are arranged to rotate about axes oblique to the direction of belt travel to direct supported articles toward the first side of the conveyor belt;
a rail at the first side of the conveyor belt to receive articles directed across the belt;
a movable obstruction including a pivot point disposed over the carryway above the article-conveying surface of the conveyor belt between the first and second sides of the conveyor;
wherein the movable obstruction intercepts a conveyed article and the article pivots at the pivot point as the conveyor belt runs in the direction of belt travel.

13. A conveyor as in claim 12 wherein the movable obstruction is movable between a first position over the article-conveying surface obstructing conveyed articles and a second position not obstructing conveyed articles.

14. A conveyor as in claim 13 wherein the movable obstruction remains in the first position for a preselected period of time.

15. A conveyor as in claim 12 wherein the movable obstruction swings out over the article-conveying surface of the belt from a position along the rail.

16. A conveyor as in claim 12 wherein the movable obstruction comprises a pusher bar extensible from the rail out over the article-conveying surface.

17. A conveyor as in claim 12 wherein the position of the pivot point over the article-conveying surface is changeable during its contact with a conveyed article.

18. A conveyor as in claim 12 further comprising a sensor detecting the presence of a conveyed article at a specific position on the conveyor.

19. A conveyor as in claim 18 wherein the sensor is selected from the group consisting of photo eyes, limit switches, weight sensors, ultrasonic sensors, and capacitive sensors.

20. A conveyor as in claim 18 wherein the conveyor belt comprises a pair of parallel conveyor belts separated by a gap and wherein the sensor is positioned beneath the conveyor carryway and vertically aligned with the gap.

21. A conveyor as in claim 18 wherein the sensor produces a signal indicative of a misoriented or oversized article on the article-conveying surface of the belt.

22. A conveyor comprising:
an angled-roller belt extending in width from a first side to a second side and in thickness from a top surface to a bottom surface and traveling in a direction of belt travel, the angled-roller belt including:
a plurality of article-supporting rollers having salient portions extending beyond the top and bottom surfaces, the rollers arranged to rotate about axes oblique to the direction of belt travel;
a roller bearing surface disposed beneath the angled-roller belt in contact with the plurality of rollers to rotate the rollers about the axes and direct conveyed articles toward the first side of the angled-roller belt;
a movable obstruction disposed above the top surface of the angled-roller belt and defining a pivot point about which conveyed articles intercepted by the movable obstruction pivot as the belt travels.

23. A conveyor as in claim 22 wherein the movable obstruction is movable between a first position over the top surface obstructing conveyed articles and a second position not obstructing conveyed articles.

24. A conveyor as in claim 23 wherein the movable obstruction remains in the first position for a preselected period of time.

25. A conveyor as in claim 22 wherein the movable obstruction swings out over the top surface of the belt from a position at the first side of the belt.

26. A conveyor as in claim 22 wherein the movable obstruction comprises a pusher bar extensible from the first side of the belt out over the top surface.

27. A conveyor as in claim 22 wherein the movable obstruction comprises a foldable side rail.

28. A conveyor as in claim 22 wherein the position of the pivot point over the top surface is changeable during its contact with a conveyed article.

29. A conveyor as in claim 22 further comprising a sensor detecting the presence of a conveyed article at a specific position on the conveyor.

30. A conveyor as in claim 29 wherein the sensor is selected from the group consisting of photo eyes, limit switches, weight sensors, ultrasonic sensors, and capacitive sensors.

31. A conveyor as in claim 29 wherein the conveyor belt comprises a pair of parallel conveyor belts separated by a gap and wherein the sensor is positioned beneath the conveyor belt along the conveying path and vertically aligned with the gap.

32. A conveyor as in claim 29 wherein the sensor produces a signal indicative of a misoriented or oversized article on the top surface of the belt.

33. A conveyor comprising:
an angled-roller belt traveling in a direction of belt travel, the angled-roller belt including:
a plurality of article-supporting rollers arranged to rotate about axes oblique to the direction of belt travel as the angled-roller belt is traveling;
a movable obstruction disposed over the angled-roller belt in a position to contact conveyed articles and to act as a pivot about which conveyed articles can pivot as the angled-roller belt is traveling.

34. A conveyor as in claim 33 wherein the movable obstruction is movable between a first position over the angled-roller belt obstructing conveyed articles and a second position not obstructing conveyed articles.

35. A conveyor as in claim 33 wherein the movable obstruction remains in the first position for a preselected period of time.

36. A conveyor as in claim 33 wherein the movable obstruction swings out over the angled-roller belt from a position beside the belt.

37. A conveyor as in claim 33 wherein the movable obstruction comprises a pusher bar extensible out over the angled-roller belt.

38. A conveyor as in claim 33 wherein the movable obstruction comprises a foldable side rail.

39. A conveyor as in claim 33 wherein the position of the pivot point over the angled-roller belt is changeable during its contact with a conveyed article.

40. A conveyor as in claim 33 further comprising a sensor detecting the presence of a conveyed article at a specific position on the conveyor.

41. A conveyor as in claim 40 wherein the sensor is selected from the group consisting of photo eyes, limit switches, weight sensors, ultrasonic sensors, and capacitive sensors.

42. A conveyor as in claim 40 wherein the angled-roller belt comprises a pair of parallel angled-roller belts separated by a gap and wherein the sensor is positioned beneath the angled-roller belt along the conveying path and vertically aligned with the gap.

43. A conveyor as in claim 40 wherein the sensor produces a signal indicative of a misoriented or oversized article on the angled-roller belt.

44. A method for rotating a conveyed article and registering it against a rail, comprising:
providing a rail along the side of a moving roller-top conveyor belt;
conveying an article along the moving roller-top conveyor belt having rollers arranged to rotate to direct the article toward the rail;
moving an obstruction to a position above the roller-top conveyor belt to intercept articles conveyed along the roller-top conveyor belt and cause the articles to rotate at the obstruction as the roller-top conveyor belt moves.

45. The method of claim 44 further comprising:
registering the conveyed articles against the rail up-stream of the obstruction.

46. The method of claim 44 further comprising:
registering the conveyed articles against the rail downstream of the obstruction.

47. The method of claim 44 further comprising:
sensing a misoriented or oversized article on the conveyor and producing a signal indicating a misoriented or oversized article; and
moving the obstruction between obstructing and unobstructing positions in response to the signal.

48. The method of claim 44 further comprising:
moving the obstruction while it is in contact with a conveyed article.

49. The method of claim 44 further comprising:
rotating conveyed articles 90° about the obstruction.

* * * * *